United States Patent [19]

Sadri

[11] Patent Number: 4,900,205
[45] Date of Patent: Feb. 13, 1990

[54] BLIND FASTENER FORMING A BLIND HEAD WITH A LARGE EFFECTIVE AREA

[75] Inventor: Shahriar M. Sadri, El Torro, Calif.

[73] Assignee: Huck Manufacturing Co., Irvine, Calif.

[21] Appl. No.: 232,593

[22] Filed: Aug. 15, 1988

[51] Int. Cl.⁴ .................. F16B 13/04; F16B 13/06
[52] U.S. Cl. ........................... 411/38; 411/42; 411/43; 411/55
[58] Field of Search .................. 411/34–39, 411/42, 43, 69, 70, 55

[56] References Cited

U.S. PATENT DOCUMENTS

| 3,277,771 | 10/1966 | Reynolds | 411/39 |
| 3,345,900 | 10/1967 | Villo | 411/41 |
| 4,033,222 | 7/1977 | Wilson | 411/33 |
| 4,142,439 | 3/1979 | Landt | 411/34 |
| 4,168,650 | 9/1979 | Dahl et al. | 411/43 |
| 4,203,346 | 5/1980 | Hall et al. | 411/34 |
| 4,376,604 | 3/1983 | Pratt et al. | 411/34 |
| 4,457,652 | 7/1984 | Pratt | 411/38 |

FOREIGN PATENT DOCUMENTS

| 0112160 | 6/1984 | European Pat. Off. | 411/39 |
| 0170769 | 2/1986 | European Pat. Off. | 411/43 |

Primary Examiner—Neill R. Wilson
Attorney, Agent, or Firm—Harness, Dickey & Pierce

[57] ABSTRACT

A blind fastener for fastening workpieces of a crushable or composite material and which provides a blind head having a large bearing area against the adjacent blind side of the workpieces and having a main sleeve and an expandable sleeve with the expandable sleeve having a reduced section or secondary portion at its leading end adapted to be severed from the remainder or primary portion of the expandable sleeve at a preselected axial or column load at which buckling has been initiated with the severed reduced section portion being substantially folded or collapsed to form the blind head with a large bearing area.

10 Claims, 2 Drawing Sheets

BLIND FASTENER FORMING A BLIND HEAD WITH A LARGE EFFECTIVE AREA

SUMMARY BACKGROUND OF THE INVENTION

The present invention relates to blind fasteners for securing workpieces of a crushable or composite material and more particularly to a blind fastener providing a blind head with a large effective bearing surface on the blind side of such workpieces.

In certain applications, especially those involving workpieces of crushable or composite materials, it is desirable to utilize a blind fastener providing a large bearing area under the blind head. The large bearing or surface area around the workpiece opening on the blind side assists in inhibiting localized crushing and flaking of the workpiece material engaged by the blind head.

Fasteners generally of the type of the present invention are shown in U.S. Pat. No. 3,345,900 to J. P. Villo issued Oct. 10, 1966, U.S. Pat. No. 4,033,222 to L. B. Wilson, issued July 5, 1977, U.S. Pat. No. 4,168,650 to W. F. Dahl, et al, issued Sept. 25, 1979, U.S. Pat. No. 4,457,652 to J. D. Pratt, issued July 3, 1984 and U.S. Pat. No. 4,203,346 to D. E. Hall et al, issued May 20, 1980.

The preceding patents generally disclose a multipiece fastener including a main sleeve and an expandable sleeve which forms a blind head as it is axially moved by a pin member over the blind end of the main sleeve. The '900 patent to Villo generally shows this structure but does not form a blind head having a large bearing area or "footprint". The '222 patent to Wilson shows a structure including three expandable sleeves in an effort to provide a blind head having a large bearing area. The '650 patent to Dahl et al and '652 patent to Pratt show an expandable sleeve having a reduced section portion at the leading end which bulbs radially outwardly to ostensibly provide a large bearing area. A variation of these structures is shown in the '346 patent to Hall et al where the reduced section portion engages a shoulder on the pin member.

The latter set of patents, i.e. Dahl et al, Pratt, and Hall et al, rely upon buckling of the reduced section portion to form the enlarged head. However, it has been determined that such fasteners do not regularly provide a blind head which engages the adjacent workpiece surface over a significant portion of the available surface area of the blind head. Thus, while the reduced section portion will in fact bulb radially outwardly to form an enlarged head, the surface at the radially outer end of the bulbed head tends to move axially away from the workpiece surface and hence does not provide the desired engagement with the workpiece surface over the full radial extent of the bulbed head.

In the present invention it has been found that a large blind side bearing area can be achieved by providing an expandable sleeve structure having a secondary or reduced section portion which is connected to the remainder or primary portion of the sleeve by a frangible section. The fastener will be set by a relative axial force applied between the pin and the main and expandable sleeves whereby the expandable sleeve is moved over a blind end of the main sleeve. In this way the secondary sleeve portion will be radially expanded first and moved axially until its free end engages the blind side of the workpieces As will be seen with the construction of the present invention the secondary sleeve portion will remain integrally connected to the primary sleeve portion until the axial or column load attains a preselected magnitude of the maximum load at which buckling occurs. At this axial load the reduced section or secondary sleeve portion will be severed from the primary sleeve portion at the frangible section. Now the primary sleeve portion will be effective to guide the buckling secondary sleeve portion and move it to a flattened, closed position. In this position the flattened reduced section portion will engage the confronting blind surface of the workpiece over substantially the entire area of the bulbed, blind head.

Thus it is an object of the present invention to provide a blind fastener for fastening workpieces of a crushable or composite material and which provides a blind head having a large bearing area against the adjacent blind side of the workpieces.

It is another object of the present invention to provide a blind fastener of the above described type having a main sleeve and an expandable sleeve with the expandable sleeve having a reduced section or secondary portion at its leading end adapted to be severed from the remainder or primary portion of the expandable sleeve at a preselected axial or column load at which buckling has been initiated with the severed reduced section portion being substantially folded or collapsed to form a blind head with a large bearing area.

It is another general object to provide a new and unique blind fastener constructed to provide a blind, bulbed head having an enlarged bearing area.

Other objects, features, and advantages of the present invention will become apparent from the subsequent description and the appended claims, taken in conjunction with the accompanying drawings.

DESCRIPTION OF THE PREFERRED EMBODIMENTS

Figure 1:
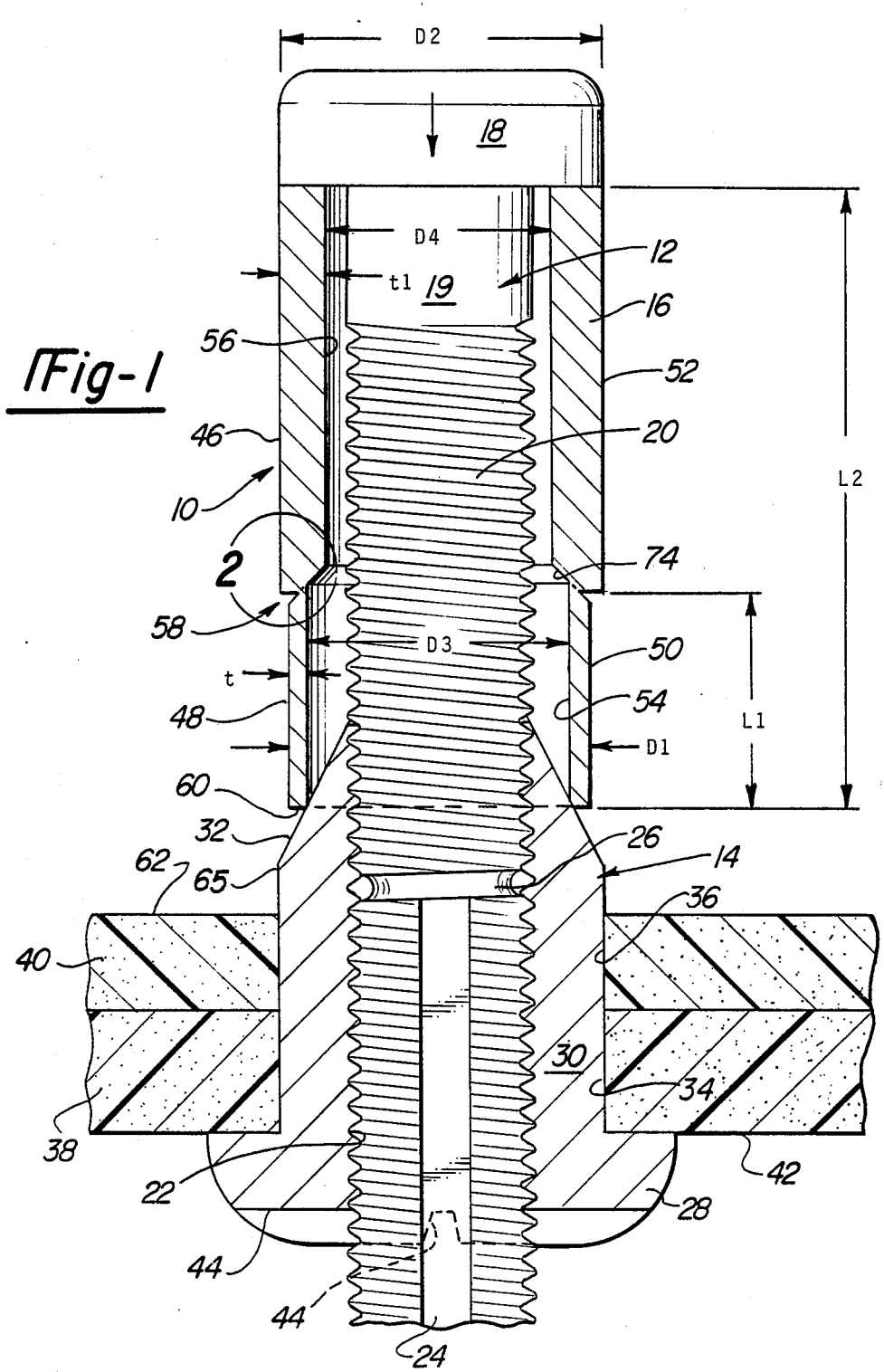
FIG. 1 is an elevational view with some parts shown in section of a fastener embodying features of the present invention and in assembly relationship with a pair of workpieces to be fastened together and including a main sleeve, an expandable sleeve and a pin member.

Looking now to FIG. 1, a multipieced fastener 10 includes a pin member 12, a main sleeve 14 and an expandable sleeve 16. Pin member 12 has an enlarged head 18 at one end and a pin shank 19. The pin shank 19 has a threaded portion 20 adapted to threadably engage mating threads in a through bore 22 of main sleeve 14.

By applying torque between the pin member 12 and the main sleeve 14 the expandable sleeve 16, which is located on the pin shank 19 adjacent the head 18, will be moved axially relative to the main sleeve 14. In the construction shown, a pair of diametrically opposed flats 24 are included on pin member 12 at its free end for accepting the chuck of a power tool (not shown) adapted to apply torque between the pin member 12 and main sleeve 14. Pin member 12 includes an annular breakneck groove 26 of reduced cross-sectional area, which is designed to fracture at a predetermined axial or torsional load.

It should be understood that the fastener 10 could be constructed as a pull type fastener with the pin member 12 having a plurality of circumferential pull grooves on pin shank 19 instead of external threads and mating threads in main sleeve 14. Such pull grooves are commonly employed on similar pulling pin structures and are formed to be gripped by conventional pull-type tools for exerting the necessary axial force on pin member 12.

The main sleeve 14 is of a protruding head type and includes an enlarged head 28, a straight shank portion 30 of generally constant outside diameter and a tapered nose portion 32. In one form of the invention the tapered nose portion 32 formed an angle of around 15° with the axis of the threaded bore 22. An angle of between around 10° to around 25° can be employed. The shank portion 30 of main sleeve 14 extends through aligned openings 34 and 36 in a pair of workpieces 38 and 40, respectively, with the protruding head 28 designed to bear against the outer or accessible surface 42 of workpiece 38. The outside diameter of shank portion 30 of main sleeve 14 is selected to fit through the aligned openings 34 and 36 with a relatively close tolerance fit. In this regard the outside diameter of the expandable sleeve 16 and pin head 18 can be accepted through the openings 34 and 36 in a clearance relationship. It is to be understood that while a protruding head 28 is shown other configurations may be used such as a flush head, etc.

As noted the fastener 10 is particularly useful where the workpieces 38 and 40 are constructed of crushable materials such as composites, or the like. The composite materials for example can be of a graphite-epoxy composite structure, an aramid fiber reinforced composite structure, or the like. One such aramid fiber reinforced composite structure is produced and sold by E. I. du Pont de Nemours & Co., Inc. under its trademark KEVLAR.

The expandable sleeve 16 includes a primary portion 46 adjacent the pin head 18 and a reduced section or secondary sleeve portion 48 located adjacent the tapered nose portion 32 of main sleeve 14. Secondary sleeve portion 48 has an outer surface 50 of a diameter D1 which is less than the diameter D2 of outer surface 52 of primary sleeve portion 46. Also the inside diameter D3 of bore or bore surface 54 of secondary sleeve portion 48 is greater than the inside diameter D4 of bore or bore surface 56 of primary sleeve portion 46. Thus the secondary sleeve portion 48 defines a cylindrical column having a wall thickness 't' which is substantially less than the wall thickness 't1' of the primary sleeve portion 46 whereby the inner and outer surfaces 50 and 54 are radially offset from and within the projected circumferential area defined by the surfaces 52 and 56 of the primary sleeve portion 46.

A frangible section 58 integrally connects the primary sleeve portion 46 and secondary sleeve portion 48.

In order to set the fastener 10, an axial force is exerted on pin member 12 by torquing the pin member 12 relative to the main sleeve 14 and expandable sleeve 16. In this regard the protruding head 28 may include a recess 44 adapted to accept a portion of the power tool (not shown) to hold the main sleeve 14 from rotating during setting of the fastener assembly 10.

The free end 60 of expandable sleeve 16 engages the tapered nose 32 on main sleeve 14, and as the secondary sleeve portion 48 moves axially over the surface of the tapered nose 32 it is radially expanded. The secondary sleeve portion 48 continues to move axially and expand radially over the blind end of straight shank portion 30 until its free end 60 engages the blind side surface 62 of workpiece 40. This engagement, in a sense, defines a stop surface. At this point, the intersection 65 between nose portion 32 and straight shank portion 30 will be approximately midway along the axial length L1 of the secondary sleeve portion 48. As more torque is applied to pin member 12 the axial column load on the secondary sleeve portion 48 increases until a preselected percentage of the magnitude of the maximum buckling load is attained. At this load, column bucking of the secondary sleeve portion 48 will be initiated; the frangible section 58 is designed to sever at this load and in response thereto fractures separating the secondary sleeve portion 48 from the primary sleeve portion 46. Under increased axial load, the pin member 12 continues to move axially to cause further buckling and hence bulbing of the secondary sleeve portion 48 radially outwardly at approximately the midpoint of its axial length L1. The now free end 64 of the primary sleeve portion 46 continues to bear against and buckle the secondary sleeve portion 48 until it is substantially completely collapsed to define a blind head 66 in substantially full circumferential, planar engagement with the blind side surface 62 of workpiece 40. This maximum diameter, substantially fully engaged bulbed head is typically around 1.5 times the original unexpanded diameter D1 of secondary sleeve portion 48. Note that the primary sleeve portion 48 also expands radially outwardly as it moves axially over the nose portion 32 of the main sleeve 14.

Figure 4:
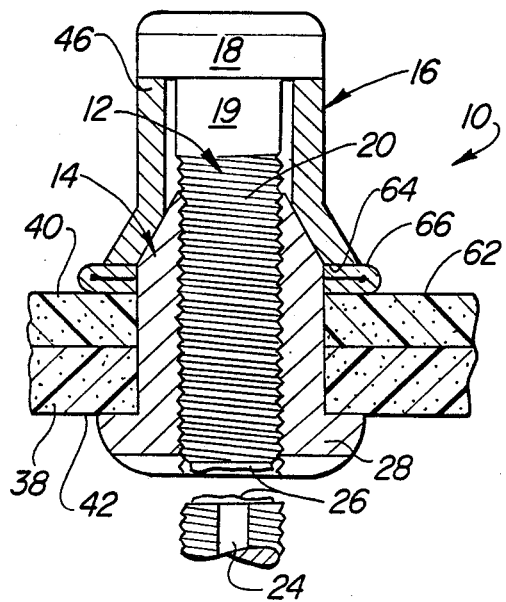
FIG. 4 is an elevational view, to reduced scale, similar to FIG. 1 and depicting the fastener in its fully set condition with the reduced section portion completely flattened against the adjacent workpiece surface.

Continued torquing of pin member 12 causes the pin to fracture at breakneck groove 26, resulting in the final assembled joint shown in FIG. 4. In this condition the free end 64 of the primary sleeve portion 46 bears against the fully collapsed and flattened secondary sleeve portion 48 whereby the workpieces 38 and 40 are secured together at a desired clamp load. Some form of locking configuration (not shown) may be provided between pin member 12 and main sleeve 14 to keep the pin from rotating and separating axially after the fastener 10 is set and hence to maintain the preload in the fastened joint.

It should be understood that the leading edge 60 of the secondary sleeve portion 48 could include a radius or combination of curvatures which would inhibit marring of the blind side surface 62 of workpiece 40 as the bulb forms. It should also be noted that the secondary sleeve portion 48 could be selectively annealed along its length L1 to provide a hardness gradient with the weakest section located such as to ensure that the bulbing is initiated at the desired point to produce the maximum diameter and optimum shaped bulb. In addition lubricants can be provided between the engaging surfaces of main sleeve 14 and expandable sleeve 16 to reduce the forces required to expand and bulb the expandable sleeve 16.

Figure 5:
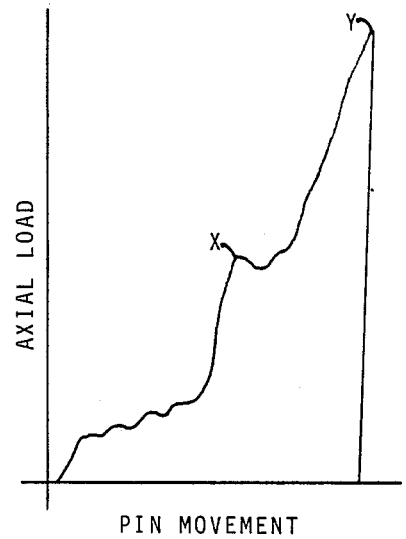
FIG. 5 is a graph of axial load on the fastener relative to axial pin movement and depicting the relationship of the maximum buckling load of the reduced section portion and the ultimate load applied to set the fastener.

The frangible section 58 is designed to fracture at an axial load which is between around 50% to around 90% of the maximum buckling load. Looking now to the curve of FIG. 5 for one fastening configuration, it can be seen that there is a determinable magnitude at which the maximum buckling load X occurs. The curve of FIG. 5 also shows the relative magnitude of the ultimate load Y at which the fastener 10 is finally set and pin break occurs at breakneck 26. Note that incipient buckling will begin at a load lower than the maximum buckling load X; however, the tubular column of the secondary sleeve portion 46 will still resist buckling until the maximum buckling load X is reached and significant bulbing deformation occurs.

It was determined that premature fracture of the frangible section 58 could result in failure of the secondary sleeve portion 48 to properly bulb resulting in an undesirable condition in which the primary sleeve portion 46 may move axially and hence radially over the secondary sleeve portion 48. Thus in one form of the invention the length L1 and the wall thickness t and relevant diameters D1 and D3 of the secondary sleeve portion 48 were selected such that the maximum buckling load X was around one half of the final clamp load and hence of the pin break load Y.

Figure 2:
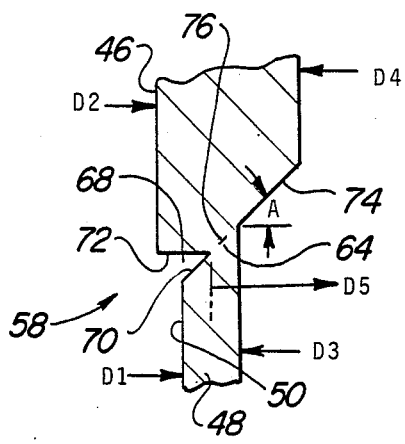
FIG. 2 is an enlarged view of the portion of the expandable sleeve of FIG. 1 taken in the Circle 2 in FIG. 1 and depicting a frangible section connecting a reduced section portion of the expandable sleeve with the remainder of the expandable sleeve.
Figure 3:
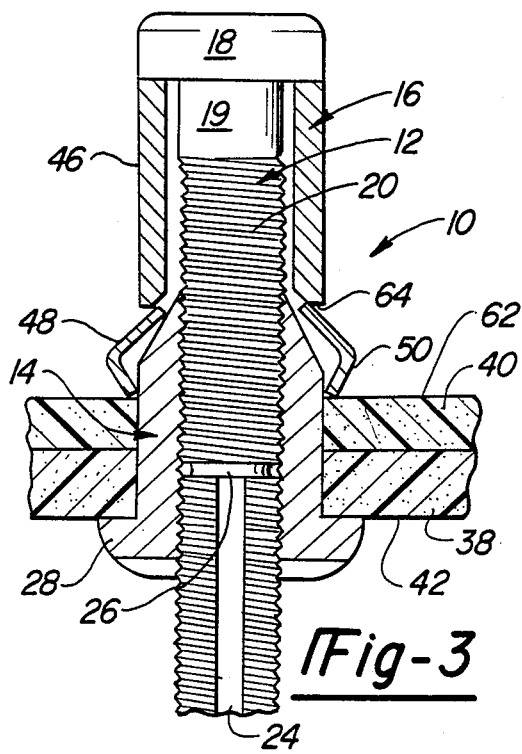
FIG. 3 is an elevational view, to reduced scale, similar to FIG. 1 depicting the fastener in a partially set condition and in which the reduced section portion has buckled further and has been severed at the frangible section.

In one form of the invention the frangible section 58 was found to perform satisfactorily when it was of a design as shown in FIG. 2. Thus, as shown, the frangible section 58 includes an annular notch 68 in the outer surface 50 at the inner axial end of the secondary sleeve portion 48. The notch 68 is defined by an annular surface 70 inclined at an angle A of from around 30° to around 60° and preferably around 45° relative to a plane transverse the longitudinal axis of the expandable sleeve 16. The opposite axial side of the notch 68 is defined by a surface 72 which is generally transverse or normal to the longitudinal axis of the expandable sleeve 16. Radially opposite the notch 68, the inside surface 74 at the end of the primary sleeve portion 46 is also inclined at an angle of from around 30° to around 60° and preferably 45° along a line which is an extension of the line of the sloped notch surface 70. Thus the notch 68 and mutually inclined surfaces 70 and 74 define a connecting web 76 inclined at an angle of from around 30° to around 60°. The inclined web 76 defines the shear plane or area at which the fracture will occur at the preselected axial load when column buckling has just begun.

In one form of the invention an expandable sleeve 16 wa constructed of 304 stainless steel and had dimensional characteristics within the following ranges:

| Nominal Dia. No. | $D_1$ | $D_2$ | $D_3$ | $D_4$ | $D_5$ | $L_1$ | $L_2$ |
|---|---|---|---|---|---|---|---|
| −06 | .190 | .195 | .1635 | .144 | .175 | .133 | .375 |
|  | .188 | .194 | .1620 | .142 | .174 | .129 | .370 |

The preceding dimensions are in inches with the "−06" size being the designation for fasteners having a nominal diameter of around 6/32 of an inch.

The pin member 12 could be constructed of A286 stainless steel and the main sleeve 14 constructed of 304 stainless steel. The angle A of notch 68 and hence the included angle between inclined surfaces 70 and 72 was set at about 45°. It should be understood, however, that other suitable materias such as titanium alloys could be employed.

With an expandable sleeve 16 having a configuration as set forth in the above chart and made of 304 stainless steel it was determined that the maximum buckling load X was around 760 lbs and the peak installation load Y was around 1510 lbs. The fracture load for frangible section 58 was then selected to be around 70% of the maximum buckling load X, i.e. 532 lbs. The ultimate shear stress of the material was known to be around 75,000 psi. Considering the angle of the web 76 and hence of the shear plane to be 45° as noted and utilizing the preceding, the diameter D5 of the depth of the notch 68 was determined to be around 0.177 inches to provide the desired shear area for the web 76. It is believed that if the angle of the shear plane is significantly greater than 45° then the severed free end 64 of the primary sleeve portion 46 will not follow and/or guide the secondary sleeve portion 48 as effectively in its bulbing from column buckling. Likewise it is believed that if the angle of the shear plane is significantly less than 45° then the tendency may be to crush the secondary sleeve portion 48 rather than promote the desired buckling. It is also believed that the similarly included surfaces 70 and 74 assist in directing the severed end of the secondary sleeve portion 48 along the surface 74 to promote folding of that end radially inwardly as buckling occurs to thereby assist the formation of the final flattened head configuration.

The preceding dimensional chart is exemplary only since other equivalent fasteners could be constructed for different sizes and materials generally following the preceding teachings.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. A blind fastener for securing a plurality of workpieces at a desired clamp load with the workpieces having aligned openings therein and having an accessible surface and a blind side surface, said fastener comprising:

a pin member having an elongated pin shank terminating at one end in an enlarged pin head;

a main sleeve member having an elongated sleeve shank terminating at one end in an enlarged head adapted to engage the accessible surface on one of the workpieces, said sleeve shank portion terminating at its opposite end in a nose portion, said sleeve shank portion adapted to be located in the aligned bores in the workpieces, said main sleeve member having a first central through bore adapted to receive said pin shank, a stop surface located generally at the blind side surface on one of the workpieces, an expandable sleeve member having a second central through bore and being located on said pin shank adjacent said pin head, said expandable sleeve member having a primary sleeve portion located adjacent said pin head and a secondary sleeve portion located adjacent said nose portion of said main sleeve member, a frangible section connecting said primary and secondary sleeve portions, said fastener adapted to be set by a relative axial force applied between said pin member and said expandable sleeve, said frangible section constructed to fracture and to separate said primary and secondary sleeve portions at a first preselected magnitude of relative axial force after said secondary sleeve portion has moved axially over said nose portion and has engaged said stop surface, said secondary sleeve portion initiating buckling at a second preselected magnitude of said relative axial force and thereafter being generally flattened as said relative axial force increases to define an enlarged flattened blind head bearing against the blind side surface over substantially the full area of said flattened blind head, said first preselected magnitude of said relative axial force being less than that required to set said fastener at the desired clamp load and generally no less than said second preselected magnitude whereby said primary sleeve section operates on said secondary sleeve portion through said frangible section generally until buckling begins.

2. The fastener of claim 1 with said secondary sleeve portion having a wall thickness less than that of said primary sleeve portion.

3. The fastener of claim 1 with said secondary sleeve portion having a wall thickness less than that of said primary sleeve portion with said secondary sleeve portion being within the confines of the circumferential area defined by said primary sleeve portion.

4. A blind fastener for securing a plurality of workpieces at a desired clamp load with the workpieces having aligned openings therein and having an accessible surface and a blind side surface, said fastener comprising:

a pin member having an elongated pin shank terminating at one end in an enlarged pin head;

a main sleeve member having an elongated sleeve shank terminating at one end in an enlarged head adapted to engage the accessible surface on one of the workpieces, said sleeve shank portion terminating at its opposite end in a nose portion, said sleeve shank portion adapted to be located in the aligned bores in the workpieces, said main sleeve member having a first central through bore adapted to receive said pin shank, a stop surface located generally at the blind side surface on one of the workpieces, an expandable sleeve member having a second central through bore and being located on said pin shank adjacent said pin head, said expandable sleeve member having a primary sleeve portion located adjacent said pin head and a secondary sleeve portion located adjacent said nose portion of said main sleeve member, a frangible section connecting said primary and secondary sleeve portions, said fastener adapted to be set by a relative axial force applied between said pin member and said expandable sleeve, said frangible section constructed to fracture and to separate said primary and secondary sleeve portions at a first preselected magnitude of relative axial force after said secondary sleeve portion has moved axially over said nose portion and has engaged said stop surface, said secondary sleeve portion initiating buckling at a second preselected magnitude of said relative axial force and thereafter being generally flattened as said relative axial force increases to define an enlarged flattened blind head bearing against the blind side surface over substantially the full area of said flattened blind head, said first preselected magnitude of said relative axial force being less than that required to set said fastener at the desired clamp load and generally no less than said second preselected magnitude whereby said primary sleeve section operates on said secondary sleeve portion through said frangible section generally until buckling begins, said frangible section including an external circumferentially extending notch having a leading surface inclined at a preselected angle, an internal surface extending generally at said preselected angle in line with said leading surface to define a web generally at said preselected angle.

5. The fastener of claim 4 with said preselected angle being around 45°.

6. The fastener of claim 4 with said secondary sleeve portion having a wall thickness less than that of said primary sleeve portion and with the inside diameter of said secondary sleeve portion being greater than the inside diameter of said primary sleeve portion, and with said internal surface being formed generally at the juncture of said primary sleeve portion and said secondary sleeve portion.

7. The fastener of claim 4 with said secondary sleeve portion buckling at a maximum buckling load and with said frangible section fracturing at a relative axial force no less than around 50% of said maximum buckling load.

8. The fastener of claim 4 with said secondary sleeve portion buckling at a maximum buckling load and with said frangible section fracturing at a relative axial force between around 50% and around 90% of said maximum buckling load.

9. A blind fastener for securing a plurality of workpieces at a desired clamp load with the workpieces having aligned openings therein and having an accessible surface and a blind side surface, said fastener comprising:

a pin member having an elongated pin shank terminating at one end in an enlarged pin head;

a main sleeve member having an elongated sleeve shank terminating at one end in an enlarged head adapted to engage the accessible surface on one of the workpieces, said sleeve shank portion terminating at its opposite end in a nose portion, said sleeve shank portion adapted to be located in the aligned bores in the workpieces, said main sleeve member having a first central through bore adapted to receive said pin shank, a stop surface located generally at the blind side surface on one of the workpieces, an expandable sleeve member having a second central through bore and being located on said pin shank adjacent said pin head, said expandable sleeve member having a primary sleeve portion located adjacent said pin head and a secondary sleeve portion located adjacent said nose portion of said main sleeve member, a frangible section connecting said primary and secondary sleeve portions, said fastener adapted to be set by a relative axial force applied between said pin member and said expandable sleeve, said frangible section constructed to fracture and to separate said primary and secondary sleeve portions at a first preselected magnitude of relative axial force after said secondary sleeve portion has moved axially over said nose portion and has engaged said stop surface, said first preselected magnitude of said relative axial force being less than that required to set said fastener at the desired clamp load, said secondary sleeve portion buckling at a second preselected magnitude of said relative axial force and being generally flattened as said relative axial force increases to define an enlarged flattened blind head bearing against the blind side surface over substantially the full area of said flattened blind head, said secondary sleeve portion having a wall thickness less than that of said primary sleeve portion and with the inside diameter of said secondary sleeve portion being greater than the inside diameter of said primary sleeve portion, said secondary sleeve portion buckling at a maximum buckling load and with said frangible section fracturing at a relative axial force between around 50% and around 90% of said maximum buckling load.

10. A blind fastener for securing a plurality of workpieces at a desired clamp load with the workpieces having aligned openings therein and having an accessible surface and a blind side surface, said fastener comprising:

a pin member having an elongated pin shank terminating at one end in an enlarged pin head;

a main shank member having an elongated sleeve shank terminating at one end in an enlarged head adapted to engage the accessible surface on one of the workpieces, said sleeve shank portion terminating at its opposite end in a nose portion, said sleeve shank portion adapted to be located in the aligned bores in the workpieces, said main sleeve member having a first central through bore adapted to receive said pin shank, a stop surface located generally at the blind side surface on one of the workpieces, an expandable sleeve member having a second central through bore and being located on said pin shank adjacent said pin head, said expandable sleeve member having a primary sleeve portion located adjacent said pin head and a secondary sleeve portion located adjacent said nose portion of said main sleeve member, a frangible section connecting said primary and secondary sleeve portions, said fastener adapted to be set by a relative axial force applied between said pin member and said expandable sleeve, said frangible section constructed to fracture and to separate said primary and secondary sleeve portions at a first preselected magnitude of relative axial force after said secondary sleeve portion has moved axially over said nose portion and has engaged said stop surface, said first preselected magnitude of said relative axial force being less than that required to set said fastener at the desired clamp load, said secondary sleeve portion buckling at a second preselected magnitude of said relative axial force and being generally flattened as said relative axial force increases to define an enlarged flattened blind head bearing against the blind side surface over substantially the full area of said flattened blind head, said expandable sleeve member when constructed of 304 stainless steel and having the dimensions of $D_1$, $D_2$, $D_3$, $D_4$ and $D_5$ and $L_1$ and $L_2$, and said frangible section having a connecting web inclined at around 45° to the axis of said expandable sleeve member, said dimensions being generally within the following ranges in inches:

| Nominal Dia. No. | $D_1$ | $D_2$ | $D_3$ | $D_4$ | $D_5$ | $L_1$ | $L_2$ |
|---|---|---|---|---|---|---|---|
| −06 | .190 | .195 | .1635 | .144 | .175 | .133 | .375 |
|  | .188 | .194 | .1620 | .142 | .174 | .129 | .370 | where "−06" is the nominal diameter of around 6/32 inches, $D_1$ is the outside diameter of said secondary sleeve portion, $D_2$ is the outside diameter of said primary sleeve portion, $D_3$ is the inside diameter of said secondary sleeve portion, $D_4$ is the inside diameter of said primary sleeve portion, $D_5$ is the outside diameter of said web, $L_1$ is the length of said secondary sleeve portion and $L_2$ is the length of said expandable sleeve member.

* * * * *